United States Patent [19]
Fendt et al.

[11] Patent Number: 5,544,915
[45] Date of Patent: Aug. 13, 1996

[54] PROCESS FOR TRIGGERING SIDE AIRBAGS OF A PASSIVE SAFETY DEVICE FOR MOTOR VEHICLES

[75] Inventors: Günter Fendt; Peter Hora, both of Schrobenhausen; Hans Spies, Pfaffenhofen; Helmut Steurer, Junkenhofen; Willibald Watzka, Aichach; Guido Wetzel, Neuburg, all of Germany

[73] Assignee: Temic Telefunken microelectronic GmbH, Heilbronn, Germany

[21] Appl. No.: 504,249

[22] Filed: Jul. 19, 1995

[30] Foreign Application Priority Data

Jul. 21, 1994 [DE] Germany ............... 44 25 846.1

[51] Int. Cl.⁶ ............ B60R 21/32; B60R 21/16; B60R 21/04; G01P 15/00
[52] U.S. Cl. .................... 280/735; 280/730.2
[58] Field of Search ................ 280/735, 730.2

[56] References Cited

U.S. PATENT DOCUMENTS

| | | | |
|---|---|---|---|
| 4,166,641 | 9/1979 | Okada et al. | 280/735 |
| 4,958,851 | 9/1990 | Behr et al. | 280/735 |
| 5,072,966 | 12/1991 | Nishitake et al. | 280/730.1 |
| 5,112,080 | 5/1992 | Okano | 280/735 |
| 5,182,459 | 1/1993 | Okano et al. | 280/735 |
| 5,202,831 | 4/1993 | Blackburn et al. | 280/735 |
| 5,208,484 | 5/1993 | Okano et al. | 280/735 |
| 5,273,309 | 12/1993 | Lau et al. | 280/730.2 |
| 5,283,472 | 2/1994 | Takeuchi et al. | 280/735 |

FOREIGN PATENT DOCUMENTS

| | | |
|---|---|---|
| 0531989 | 3/1993 | European Pat. Off. . |
| 0576018 | 12/1993 | European Pat. Off. . |
| 4218483 | 12/1992 | Germany . |
| 4304152 | 8/1993 | Germany . |
| 4220270 | 12/1993 | Germany . |
| 4302399 | 3/1994 | Germany . |
| 4324753 | 3/1994 | Germany . |
| 4322488 | 5/1994 | Germany . |
| 4403502 | 8/1994 | Germany . |

*Primary Examiner*—Kenneth R. Rice
*Attorney, Agent, or Firm*—Spencer & Frank

[57] ABSTRACT

To trigger driver and passenger airbags as well as side airbags, the sensor signals generated by collision sensors will be fed into a central control unit for processing. According to this invention, side airbags will be activated by evaluating sensor signals generated by a collision sensor for detecting head-on and side collisions, centrally located within the motor vehicle, as well as by a left-hand and right-hand collision sensor each detecting side collisions, by the control unit generating a triggering signal whenever the centrally located collision sensor and at least one of the two side collision sensors generate a collision signal, with one of these two collision sensors having a greater value, or if the centrally located collision sensor as well as one of the two side collision sensors provide a signal of equal value, with the other side collision sensor simultaneously generating a collision signal with a value either equal or lower than the value of the collision signal generated by the central collision sensor. The process according to this invention will lead to a very high degree of triggering certainty for the entire occupant protection system, and advantageously does not require the use of a mechanical safety switch to trigger the side airbags.

4 Claims, 2 Drawing Sheets

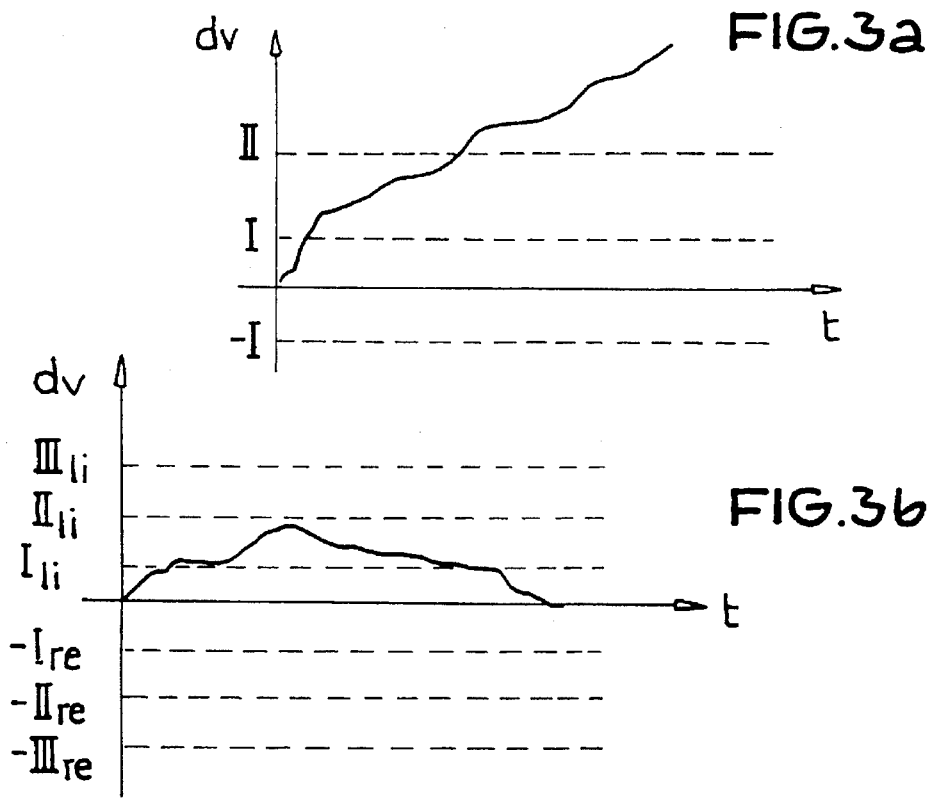

PROCESS FOR TRIGGERING SIDE AIRBAGS OF A PASSIVE SAFETY DEVICE FOR MOTOR VEHICLES

BACKGROUND OF THE INVENTION

This invention concerns a process for triggering side airbags of a passive safety device for motor vehicles, which additionally comprises a driver as well as a passenger airbag, a collision sensor located centrally inside the motor vehicle for detecting head-on and side collisions, and left-hand and fight-hand side collision sensors, as well as a control unit evaluating the sensor signals generated by these collision sensors; and, for evaluating the force of a side collision impact, threshold values are specified for the sensor signals of the centrally located collision sensor as well as for the sensor signals of the side collision sensors; and a collision signal will be generated whenever a sensor signal exceeds the lowest threshold value specified.

An occupant protection system for motor, vehicles as a rule consists of an airbag triggering device designed as a control unit comprising four output stages for driving the driver and passenger airbags, as well as the respective belt tensioners for driver and passenger. However, these airbags protect vehicle occupants only in the event of a head-on collision of the vehicle, but not in the event of a side collision. It was proposed therefore to fit an airbag—a so-called side airbag—in the area of the vehicle door in order to restrain the side movement of vehicle occupants. Due to the short deformation path in the event of a side crash, these side airbags require a short triggering time of less than 5 msec; therefore, in addition to the existing collision sensor located centrally inside the motor vehicle for detecting front and side collisions, two extra sensors will be required, all to be located in the door area. Moreover, these additional external sensors are also required because the acceleration signal in the central collision sensor, generated by the crash, cannot yet be evaluated within the required triggering time due to the greater distance to the force input point; at the time of the triggering time required, this acceleration signal will not yet have reached the central area of the vehicle at full amplitude.

Furthermore, it is generally known that before any triggering of a driver or a passenger airbag not only the sensor signals of the central acceleration sensor need to be evaluated; it is also necessary to take the status of a mechanical safety switch into account which mechanical safety switch has an effective action direction parallel to the direction of vehicle travel.

SUMMARY OF THE INVENTION

As, however, in the event of a side crash the proctective function of the mechanical safety switch cannot be used, the object of the invention is to provide a triggering process for side airbags which does not require the use of such a safety switch.

According to the invention, there is provided a safety concept which will link up the information provided by the collision sensor located centrally inside the motor vehicle with the information provided by the side collision sensors, and derive a triggering signal therefrom. In the process according to this invention, a triggering signal for a side airbag will on the one hand be generated if the centrally located collision sensor and at least one of the two side collision sensors generate a collision signal, with one of the two collision signals having a greater value, and, on the other hand, if the centrally located collision sensor as well as one of the two side collision sensors provide a signal of equal value, with the other side collision sensor simultaneously generating a collision signal with a value either equal or lower than the value of the collision signal generated by the central collision sensor. In this context, a collision signal exists if the value of the corresponding sensor signal exceeds a defined threshold value, with further threshold values specified in ascending sequence in order to enable evaluation of the force of a collision impact by comparison with sensor signals.

According to this invention, the triggering process for side airbags will allow the design of an airbag safety device featuring a high degree of triggering certainty with a low probability of incorrect triggerings, advantageously not requiring the use of a mechanical safety switch in a side direction.

According to a further advantageous application of the process pursuant to this invention, a triggering signal for one of the side airbags will also be generated, if the centrally located collision sensor and, at the same time, a side collision sensor each provide a collision signal of equal value, with these values exceeding the largest threshold value.

According to this invention, a further advantage of the triggering strategy for side airbags is that triggering of side airbags will be assured even if one of the external sensors is defective, that is, if it does not generate any collision signals. Furthermore, for another preferred implementation of this invention, it is possible —in comparison to the number of threshold values provided for the centrally located collision sensor—to provide a lower number of threshold values each for evaluating the collision signals generated by the side collision sensors. This takes into account the circumstance that the device can be adapted to varying vehicle characteristics.

According to a final advantageous implementation of this invention, a triggeriung signal will be generated even if there is only a collision signal by the centrally located collision sensor, with the value of this signal exceeding the largest threshold value. This ensures the triggering of one of the side airbags even in the event of side collision sensors being defective, if the centrally located collision sensor detects a forceful side impact; in such a case, vehicle occupants are thus protected at least in the event of serious collisions.

BRIEF DESCRIPTION OF THE DRAWINGS

The process according to this invention, by means of a triggering device for airbags and in conjunction with the drawings, is to be illustrated and elucidated below. These drawings illustrate.

DESCRIPTION OF THE PREFERRED EMBODIMENTS

Figure 1:
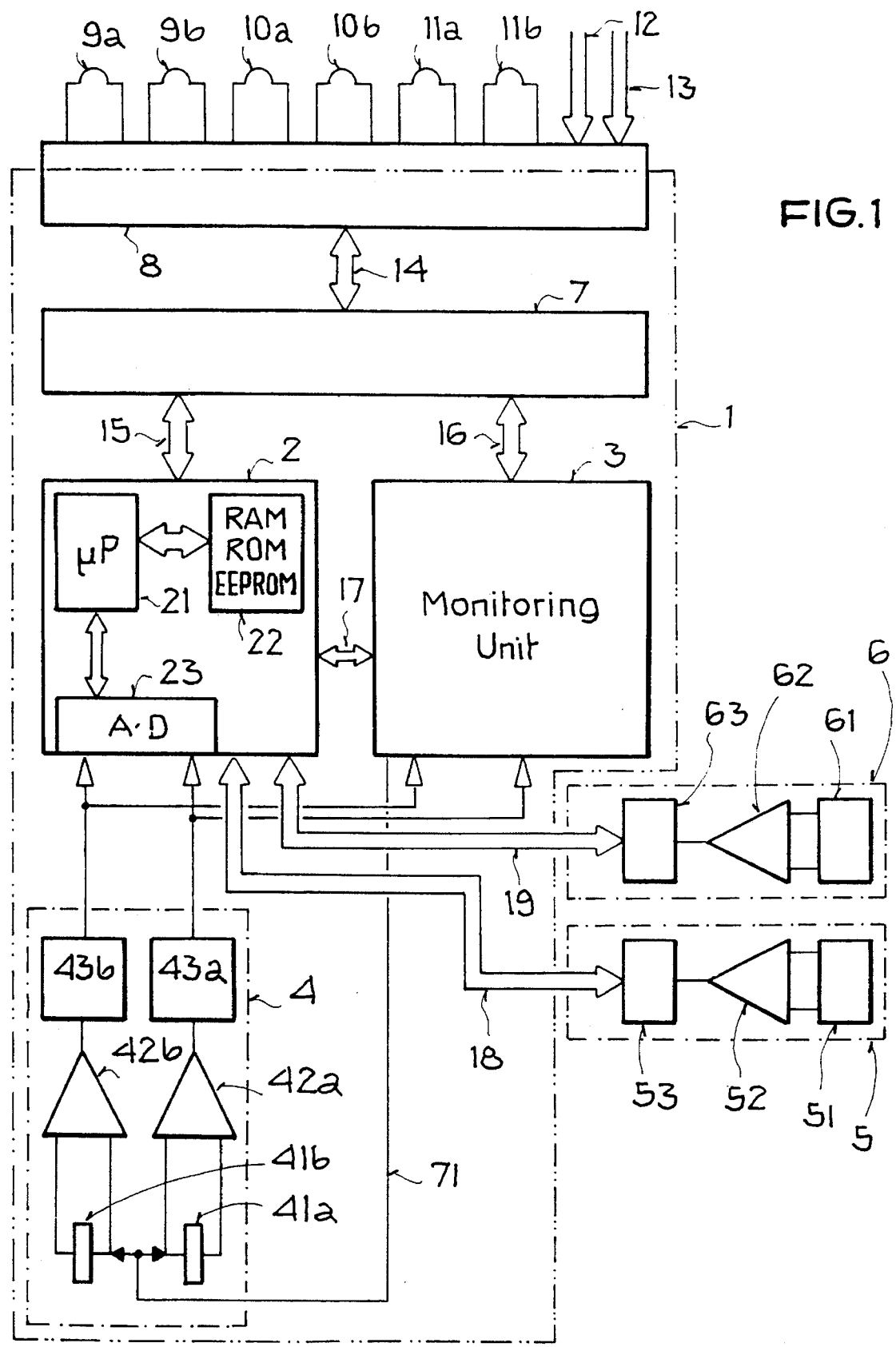
FIG. 1 a block diagram of a triggering device for airbags to implement the process according to this invention, FIG. 2 a triggering matrix for a left-hand side crash, FIG. 3a velocity change/time diagrams complete with relevant threshold values, for evaluating collision force, of a side collision sensor as well as a centrally located collision sensor, and FIG. 4 a further implementation example for a triggering matrix in the event of a left-hand side collision.

In FIG. 1, a central control unit is designated as reference item 1, which control unit is located on an electronic circuit board at a central location within the motor vehicle and contains a central acceleration transducer 4. Basically, this acceleration transducer 4 is an acceleration transducer system, as it is quite conceivable to use two individual transducers or separate transducers. In addition to this acceleration transducer 4, which is able to detect head-on as well as side collisions, sensor units 5 and 6 will each be provided, respectively, in the area of the vehicle doors for the exclusive detection of side collisions; via a data line 18 and 19, these sensor units 5 and 6 are each linked to a microprocessor 2 of control unit 1. Even the sensor signals generated by the acceleration transducer 4 will also be fed into this microprocessor 2, via an A/D converter 23.

This acceleration transducer 4 comprises two acceleration sensors 41a and 41b, whose sensor signals will be amplified by means of amplifier units 42a and 42b, and, respectively, fed into a filter unit 43a or 43b before being passed on to microprocessor 2. These two sensors 41a and 41b are arranged such that they are located in a ±45° direction to the direction of travel, thus enabling detection of an angled impact or a side collision. Sensor units 5 and 6 feature a similar setup but have each been designed with a single sensor element 51 or 61, usually a shock sensor, an amplifier element 52 or 62, and—in contrast to acceleration transducer 4—an additional signal processing circuit 53 or 63, which advantageously takes the form of a microprocessor. This signal processing circuit 53 or 63 will carry out an evaluation with regard to the values of the sensor signals generated by sensors 51 and 61. The value of these sensor signals will be proportional to the velocity change per time unit, so that—using a specified fixed threshold value I according to FIG. 3a—a collision signal will be present only, if the sensor signal exceeds this threshold value. A more violent side crash will be present if the sensor signal exceeds a further second threshold value II, whose value will be larger than the first threshold value I, i.e. I<II. A threshold −I or −II, displaying a minus sign, indicates that if the sensor signal falls below that value a side collision from the opposite direction has occurred. The evaluation of sensor signals with regard to these threshold values I and II or −I and −II will be carried out by signal processing circuit 53 or 63, passing the relevant digital data on line 18 or 19 to processor 2 of triggering circuit 1.

As sensor units 5 and 6 are not located on the printed circuit board where central control unit 1 is located, these are also designated as external sensor units.

The sensor signals generated by acceleration transducer 4 will also be evaluated by means of three threshold values I, II, and III—as illustrated in FIG. 3b. For detection of an angled impact or a side crash, the two sensor elements 41a and 41b will be located at ±45° relative to the direction of vehicle travel. Differentiation between a head-on impact and a side impact will be carried out by microprocessor 2; and in the event of a side impact, this microprocessor 2 will also evaluate its degree of violence, using the specified threshold values I, II, and III. Finally, using the sensor signals generated by acceleration transducer 4, it is also possible to differentiate between a left-hand side impact and a right-hand side impact. According to FIG. 3b, a left-hand side impact will be present, if the relevant sensor signal exceeds the lowest threshold value I; but a right-hand side impact will be detected, if the relevant sensor signal is lower than the negative values of threshold values −I, −II, and −III. This differentiation between right-hand and left-hand impact will be indicated in FIG. 3b by the indices "li" (l/h) and "re" (r/h).

The control unit 1 further comprises a so-called monitoring unit 3 which continuously monitors the operational functionality of control unit 1. This monitoring unit 3 is linked to microprocessor 2 via a data line 17; in memory unit 22 of this microprocessor 2 the triggering algorithm will be stored a.o. Finally, this monitoring unit 3 will monitor the two channel acceleration unit 4 via a line 71.

This microprocessor 2 as well as monitoring unit 3 are linked via a data line 15 and 16 with an output and interface circuit 7, which in its turn is connected via a line 14 to a connector unit 8. This connector unit 8 will make the relevant connections to the means of triggering, that is, trigger pellets of driver and passenger airbags 9a and 9b, side airbags 10a and 10b as well as belt tensioners 11a and 11b for driver and passenger. Finally, by means of a data line 12, seat occupancy detection as well as diagnosis line 13 will be routed via this connector unit 8.

To trigger a side airbag 10a or 10b, the signals generated by the external sensor units 5 and 6 will be linked by microprocessor 2 to the evaluation results derived from acceleration transducer 4, and a trigger signal derived. This linking of relevant information to decide whether an airbag should be trigggered or not is illustrated in a triggering matrix according to FIG. 2 and, by way of example, shown for a left-hand side crash. It is apparent from this that, in a triggering event, microprocessors 53 or 63 of external sensor units 5 or 6 as well as microprocessor 2 must detect a collision signal when evaluating the sensor signals of acceleration transducer 4, that is, that the relevant sensor signals must have exceeded the first threshold value I. According to FIG. 2, a triggering signal will thus be generated if the centrally located collision sensor, i.e. acceleration transducer 4 according to FIG. 1, generates a sensor signal the value of which will exceed threshold value $III_{li}$ according to FIG. 3b whilst the right-hand collision sensor will simultaneously provide a sensor signal which is lower than the negative threshold value −I (compare FIG. 3a). Here, this triggering signal will be generated quite independently from the information provided by the left-hand collision sensor. That is, in the event of a defective left-hand collision sensor, triggering is still certain to take place. Even in the event of a defective right-hand collision sensor—as shown in the second or fourth line of the triggering matrix according to FIG. 2—triggering is still certain to take place. The relevant sensors will provide a sensor signal which is either greater than the first threshold value or greater than the second threshold value, according to FIGS. 3a and 3b, with regard to the centrally located collision sensor or with regard to the left-hand collision sensor. It is to be noted here that the relevant threshold values for the side collision sensors, or the centrally located collision sensor, may have different values. This is to ensure that in the event of a crash triggering will always be certain to take place, and that the sensor can be adapted to different vehicle structures. In summary, therefore, the triggering strategy for side airbags provides for the centrally located collision sensor as well as at least one side collision sensor having to generate a collision signal indicating a side impact, with one of the two values—when compared to the other value—exceeding the next higher threshold value, or both values exceeding their relevant threshold values by a significant amount.

Line 3 of the triggering matrix according to FIG. 2 governs the triggering event in which the centrally located collision sensor as well as a side collision sensor generate a collision signal each, which signals however exceed the first threshold value I only but not the next higher threshold value. In such a case, the side airbag will not be triggered; it will be triggered only if also the second side collision sensor generates a relevant sensor signal indicating a side collision from the same side direction. This triggering strategy will be applied even when the centrally located collision sensor as well as one side collision sensor generate sensor signals whose values each exceed their respective second threshold values but not the third threshold value.

The triggering strategy shown in FIG. 2 thus takes into account that one of the two side collision sensors may be defective. If, however, both external sensor units are not functional, i.e. do not transmit any information to the control trait, there will be no triggering in the event of a side crash.

But in order to offer some protection still, if two external sensor units are defective at the same time, the triggering strategy according to FIG. 4 provides for a side airbag to be triggered even if the centrally located collision sensor detects a serious side crash, that is, the value of the relevant sensor signal exceeds the largest threshold value, i.e. threshold value III. In this way, from a certain level of serious accident impact, the central control unit will be enabled to trigger on its own, even if the two external sensor units are defective. In all other respects the triggering strategy of the triggering matrix according to FIG. 4, as shown in its lines 3, 4 and 5, corresponds to that displayed in FIG. 2.

What is claimed is:

1. A process for triggering side airbags of a passive safety device for motor vehicles, which additionally comprises a driver as well as a passenger airbag, a collision sensor located centrally inside the motor vehicle for detecting head-on and side collisions, and left-hand and right-hand side collision sensors, as well as a control unit evaluating the sensor signals generated by these collision sensors; and, for evaluating the force of a side collision impact, threshold values are specified for the sensor signals of the centrally located collision sensor as well as for the sensor signals of the side collision sensors; and a collision signal will be generated whenever a sensor signal exceeds the lowest threshold value specified, and wherein a triggering signal for an airbag will be generated if a) the centrally located collision sensor as well as at least one side collision sensor simultaneously generate a collision signal each, indicating a side crash, with one of the two sensor signal values when compared to the other value exceeding the next higher threshold value, or both values exceeding the next higher value, or b) the centrally located collision sensor as well as one side collision sensor simultaneously provide a collision signal each of equal force, indicating a side crash, with the value of these signals being lower than the largest threshold value, and if at the same time the other side collision sensor provides a collision signal indicating the same side crash event; the force of the latter signal either corresponds to the force of the collision signal generated by the centrally located collision sensor or is lower than that force.

2. Process according to claim 1 wherein a triggering signal for triggering a side airbag will be generated if the centrally located collision sensor as well as one side collision sensor simultaneously provide a collision signal each of equal force, and indicating a side crash, with the values of these signals exceeding the largest threshold value.

3. Process according to claim 1 wherein, for evaluating the force of the collision signals generated by the side collision sensors, a lower number of threshold values each will be provided than for the collision signals generated by the centrally located collision sensor.

4. Process according to claim 1 wherein a triggering signal for a side airbag will be generated if it is only the centrally located collision sensor which generates a collision signal whose value exceeds the largest threshold value.

* * * * *